Oct. 19, 1948.  E. HADE  2,451,674
CLOTHES DRIER
Filed Jan. 22, 1945
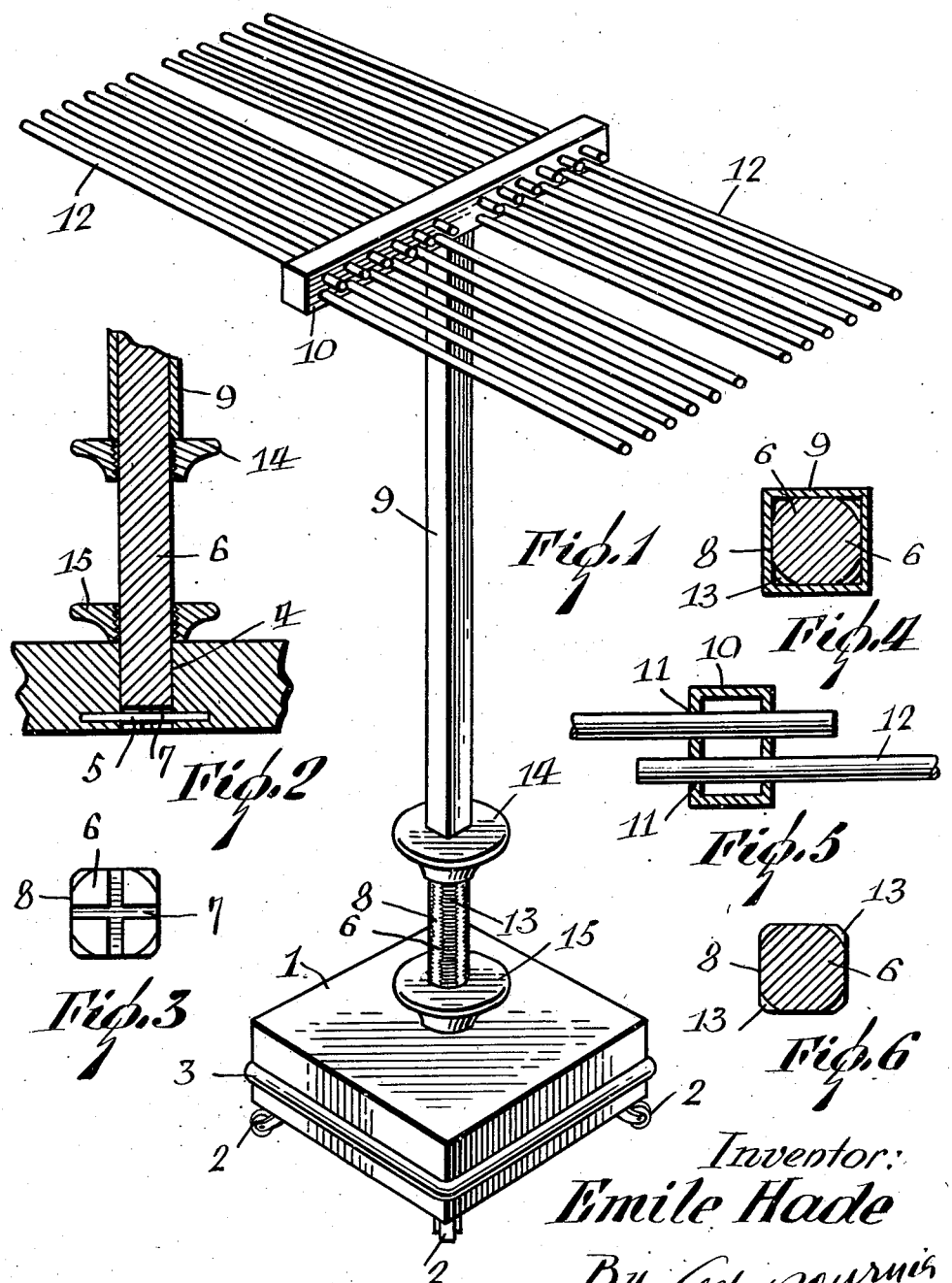
Inventor:
Emile Hade Patented Oct. 19, 1948

2,451,674

UNITED STATES PATENT OFFICE 2,451,674

CLOTHES DRIER

Emile Hade, Montreal, Quebec, Canada

Application January 22, 1945, Serial No. 573,866

1 Claim. (Cl. 211—176)

The present invention pertains to a novel clothes drier of the type comprising a plurality of arms extending from a head on a post.

The principal object of the invention is to provide a simple, inexpensive and durable device of this character capable of adjustment in height and also in the direction of the arms.

In the accomplishment of these objects, there is provided a base having a hole in which the lower end of the post is inserted. The lower extremity of the post has a pair of intersecting grooves, either of which is adapted to receive a cross pin in the hole, to prevent the post from turning. A nut threaded on the post and engaging the base permits the post to be raised off the pin, so that it may be turned manually to engage the other groove with the pin and thereby alter the direction of the arms.

The post is fitted with a slidable tube carrying at its upper end a cross bar which, in turn, carries the clothes-supporting arms. The lower end of the post carries another nut threaded thereon and engaging the lower extremity of the post. By this means, the elevation of the tube and the arms on the post may be regulated.

The invention is fully disclosed by way of example in the following description and in the accompanying drawing in which:

Figure 1 is a perspective view of the device;

Figure 2 is a vertical section at the lower end;

Figure 3 is a bottom plan view of the post;

Figure 4 is a horizontal section on line 4—4 of Figure 2;

Figure 5 is a vertical section of the cross bar; and

Figure 6 is a horizontal section on line 6—6 of Figure 2.

Reference to these views will now be made by use of like characters which are employed to designate corresponding parts throughout.

The device stands on a heavy base 1 made of metal, concrete or the like and equipped with rollers 2. The base is also preferably surrounded by a rubber bumper 3. A central hole 4 is formed in the base and provided with a cross pin 5. A post 6 has its lower end shaped to fit in the hole 4 and has its lower extremity formed with cross grooves 7 at right angles to each other. Either groove may be set on the pin 5, thus enabling two positions of the post at right angles to each other.

The post is substantially square in cross section, as indicated by the flat sides 8 in Figures 3, 4 and 6. A square tube 9 is fitted slidably on the upper portion of the post 6 and carries at its upper end a cross bar 10, also square in cross section and hollow, as shown in Figure 5.

The cross bar 10 is formed with alined apertures 11 at opposite sides, in two horizontal series at different levels. Each pair of alined apertures receives an end of a thin arm 12, the major portion of which extends beyond the cross bar and is adapted for hanging clothes.

The edges of the post 6 are rounded and threaded at 13, between the base 1 and the tube 9, and receives a pair of nuts 14, 15. The upper nut 14 supports the lower end of the tube 9. Thus, the height of the cross bar 11 is regulated by adjusting the nut 14 on the threaded portion 13.

The nut 15 bears upon the base 1. To turn the post 90°, the nut 15 is first rotated to elevate the post slightly and lift the engaged groove 7 off the pin 5. The post is then turned 90° by hand, and the nut returned to its original position permitting the other groove to receive the pin 5. The weight of the post is taken by the nut 15 rather than the pin 5, but the reception of the pin in one of the grooves prevents the post from turning in the base. For displacement of the base 1 a towing arm (not shown) could be added.

It will now be seen that the invention provides a simple clothes drier constructed of durable and inexpensive parts and capable of adjustment in height and direction of the clothes-supporting arms.

Although a specific embodiment of the invention has been illustrated and described it will be understood that various alterations in the details of construction may be made without departing from the scope of the invention as indicated by the appended claim.

What I claim as my invention is:

A clothes drier comprising a base having a vertical hole, a cross pin in said hole, a post receivable in said hole, the lower extremity of said post having a pair of intersecting grooves adapted selectively to receive said pin, a nut threaded on said post and engaging said base to effect lifting said post from said pin, said post having a cross bar at its upper end with horizontal arms extending from said cross bar.

EMILE HADE.

REFERENCES CITED

The following references are of record in the file of this patent:

UNITED STATES PATENTS

| Number | Name | Date |
|---|---|---|
| 289,179 | Tregurtha | Nov. 27, 1883 |
| 925,011 | Moon | June 15, 1909 |
| 1,175,817 | Robertson | Mar. 14, 1916 |
| 1,250,833 | Flanegin | Dec. 18, 1917 |
| 1,453,147 | Kunz | Apr. 24, 1923 |
| 1,471,909 | Miller | Oct. 23, 1923 |
| 1,525,701 | Rose et al. | Feb. 10, 1925 |
| 1,620,199 | Felicety | Mar. 8, 1927 |
| 1,871,288 | Whitney | Aug. 9, 1932 |
| 2,089,868 | Williams | Aug. 10, 1937 |
| 2,182,003 | Roark | Dec. 5, 1939 |
| 2,283,987 | Hammar | May 26, 1942 |